United States Patent [19]

Suzuki et al.

[11] Patent Number: 5,051,527
[45] Date of Patent: Sep. 24, 1991

[54] LIQUID CRYSTAL COMPOUNDS HAVING FLUOROALKYL RADICAL

[75] Inventors: Yoshiichi Suzuki; Takashi Hagiwara; Hiroyuki Mogamiya, all of Tokyo, Japan

[73] Assignee: Showa Shell Sekiyu K.K., Tokyo, Japan

[21] Appl. No.: 316,831

[22] Filed: Feb. 28, 1989

[30] Foreign Application Priority Data

Feb. 29, 1988 [JP] Japan ................................. 63-44577

[51] Int. Cl.$^5$ ..................... C07C 69/76; C07C 249/00; C09K 19/52
[52] U.S. Cl. ............................. 560/51; 252/299.01; 252/299.6; 252/299.03; 252/399.64; 252/299.65; 252/299.66; 252/299.67; 252/299.68; 564/272; 564/274; 560/53; 560/59; 560/54; 560/55; 560/60; 560/61; 560/64; 560/67; 560/73; 560/84; 560/86; 560/103; 560/105; 560/106; 560/107; 560/108; 560/109; 560/118
[58] Field of Search .......... 252/299.01, 299.6, 299.63, 252/299.64, 299.65, 299.66, 299.67, 299.68; 564/272, 274; 560/51, 53, 54, 55, 59, 60, 61, 64, 67, 73, 84, 86, 103, 105, 106, 107, 108, 109, 118

[56] References Cited

U.S. PATENT DOCUMENTS

| 4,886,619 | 12/1989 | Janulis ........................ 252/299.01 X |
| 4,918,213 | 4/1990 | Nohira et al. ..................... 560/64 X |
| 4,921,632 | 5/1990 | Nakamura et al. ......... 252/299.01 X |
| 4,929,760 | 5/1990 | Kitazume et al. ................... 568/308 |
| 4,973,738 | 11/1990 | Suzuki et al. .................... 252/299.6 |
| 4,985,172 | 1/1991 | Wingen et al. ................ 252/299.67 |

FOREIGN PATENT DOCUMENTS

| 331367 | 9/1989 | European Pat. Off. ........ 252/299.01 |
| 64-3154 | 1/1989 | Japan .............................. 252/299.01 |
| 01-283258 | 11/1989 | Japan .............................. 252/299.01 |
| 01-294652 | 11/1989 | Japan .............................. 252/299.01 |
| 01-301639 | 12/1989 | Japan .............................. 252/299.01 |
| 01-319459 | 12/1989 | Japan .............................. 252/299.01 |
| 02-011570 | 1/1990 | Japan .............................. 252/299.01 |
| 02-045468 | 1/1990 | Japan .............................. 252/299.01 |
| 02-056447 | 2/1990 | Japan .............................. 252/299.01 |
| 02-067242 | 3/1990 | Japan .............................. 252/299.01 |
| 02-115144 | 4/1990 | Japan .............................. 252/299.01 |
| 02-155986 | 6/1990 | Japan .............................. 252/299.01 |
| 02-18869 | 7/1990 | Japan .............................. 252/299.01 |

OTHER PUBLICATIONS

Japanese Journal of Applied Physics/Part 2: Letters, vol. 2, No. 2, pp. L77–L78, 1987.
Chen, Q. et al. Ituaxue Xuebao, 4216) 541, 1984.

*Primary Examiner*—John S. Maples
*Assistant Examiner*—Richard Treanor
*Attorney, Agent, or Firm*—Sughrue, Mion, Zinn, Macpeak & Seas

[57] ABSTRACT

The invention lies in novel ferroelectric liquid crystal compounds particularly represented by the general formulae, having a good responsibility in relation to the applied electric field and a wide range of phase transition points inclusive of the room temperature so as to be useful alone as the liquid crystal material but also to be mixed with other liquid crystal compounds for expanding the phase transition points to a desired range and making the response speed of the liquid crystal composition faster.

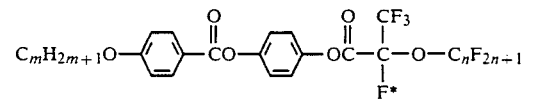

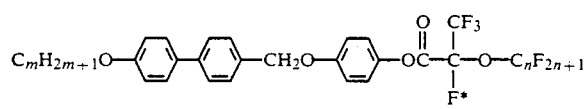

In the formulae, m and n are same or different with each other and represent an integral of 1–20.

9 Claims, 3 Drawing Sheets

}

LIQUID CRYSTAL COMPOUNDS HAVING FLUOROALKYL RADICAL

BACKGROUND OF THE INVENTION AND RELATED ART

The invention relates to novel liquid crystal compounds, and more particularly to novel smectic and ferroelectric liquid crystal compounds having a fluoroalkyl group.

The ferroelectric liquid crystal compounds are characterized by the molecular structure comprising at least one assymetric carbon atom in the molecule, having a large dipole moment in the direction vertical to the molecular apsis line and showing a smectic phase in which the molecular apsis line is tilted to the phase normal by a some degree. Such are generally optically active compounds having an optically active radical at the side chain.

Recently it has been made clear that the molecular structure of the optically active radical as well as the interaction between the assymetrical carbon part and the dipole moment carrying part may considerably affect on the liquid crystallization e.g. by J.W. Gooddy, E. Chin et al., J. Am Chem. Soc.108 4729–4735 (1986), ibid. 108 4736–4742 (1986). It has been tried, thus, to derive a liquid crystal compound from an optically active compound.

The optically active compounds used until now for that purpose are for instance derivatives of lactic acid, butyric acid, amino acid and an optical active 2-alkanol such as 2-octanol and amyl alcohol.

Perfluoro compounds having an optically active perfluoroalkyl radical, substituted with a perfluoroalkyl, perfluoroalkoxy or perfluoroalxenyloxy group are chemically, thermally or optically stable so as to be useful compounds for that purpose. Despite of that these compounds have not yet been used for the assymetric carbon part of the liquid crystal compounds, possibly due to that synthesis thereof has been though to be difficult.

SUMMARY OF THE INVENTION

It is an object of the invention, thus, to provide novel ferroelectric liquid crystal compounds having an optically active fluoroalkyl radical.

The object can be attained by novel liquid crystal compounds according to the invention and represented by the general formula (I), R—(A)—X—(B)—Y—Rf    (I)

in which R means an alxyl, alkoxy, alkyloxycarbonyl, alkanoyl or alkanyloxy group of 1-20 carbon atoms; Rf means an optically active perfluoroalkoxyalkyl radical (A) and (B) respectively mean

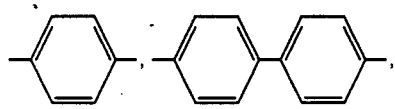

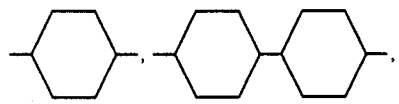

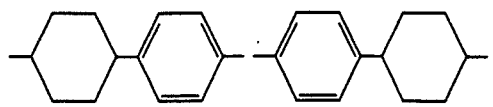

X means —CO—, —OC—, —CH$_2$O—, —OCH$_2$— or

—CH=N—; and

Y means —COCH$_2$—, —OC— or —O—CH$_2$—.

DESCRIPTION OF PREFERRED EMBODIMENTS OF THE INVENTION

Figure 1:
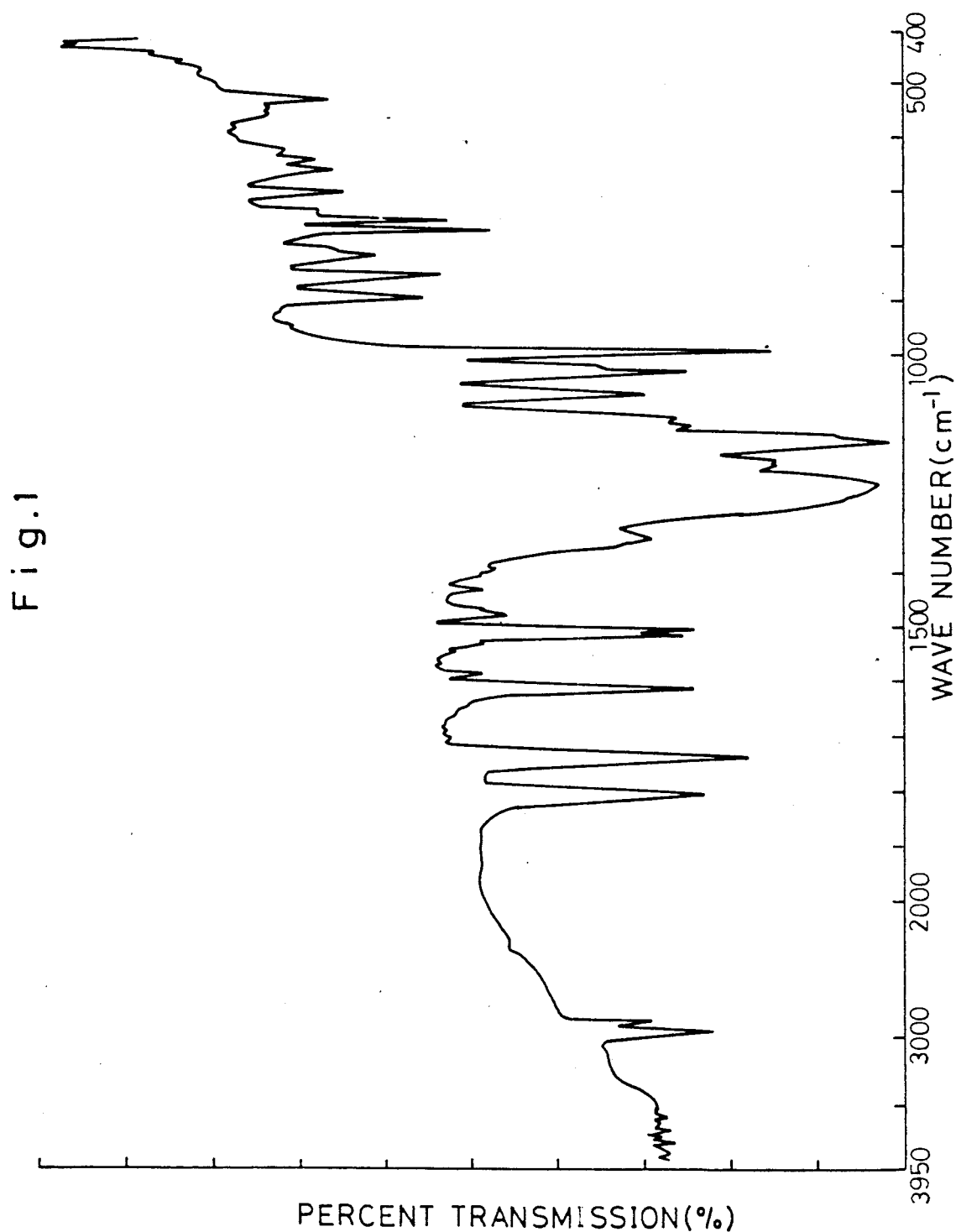
FIG. 1 shows infrared absorption spectrum of 4-[1,1,1,2-tetrafluoro-2-(perfluoro-n-propoxy) proponyloxy]phenyl-4-n-octyloxybenzoate, one of the objective compounds according the invention.

Among the novel liquid crystal compounds according to the invention of the formula (I), R—(A)—X—(B)—Y—Rf, those having following optically active radicals as —Y—Rb are particularly useful as ferroelectric liquid crystals.

1) Perfluoro-2-propoxy-propionyloxy radical (II)

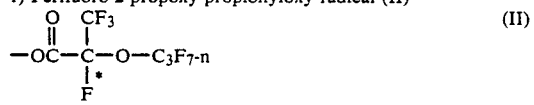

2) Perfluoro-2-isopropoxy-propionyloxy radical (III)

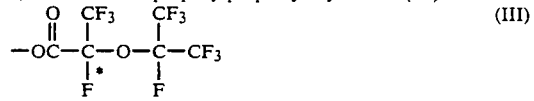

3) Perfluoro-2-alkoxy-fatty acid radical (IV)

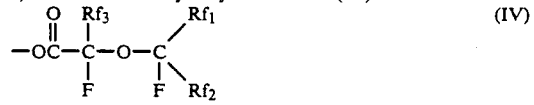

In the formula, Rf1, Rf2, and Rf3 may be same or different to one another and means a perfluoroalkyl or perfluoroalkenyl group of 6 carbon atoms or less.

In the liquid crystal compounds of the formula (I), R more preferably means hexyl, octyl, isobutyl, hexyloxy, octyloxy and isobutoxy.

In the compounds of the formula (I), particularly suitable —(A)—X—(B)—Y—are;

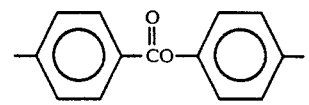

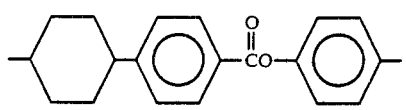
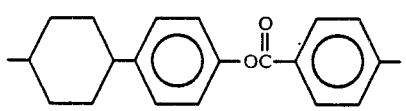
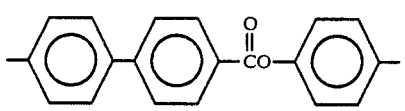
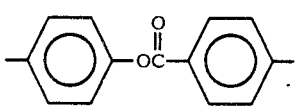
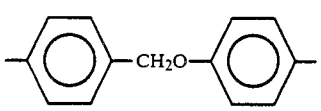
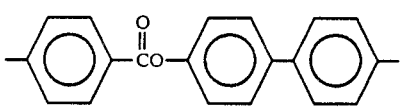
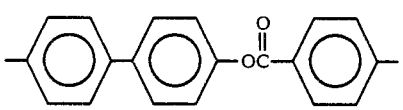
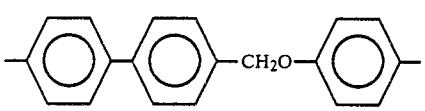
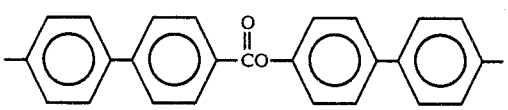
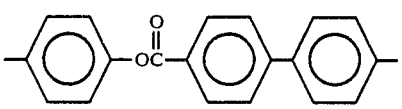
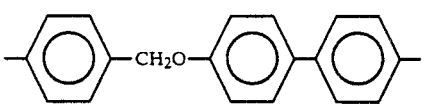
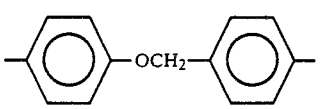
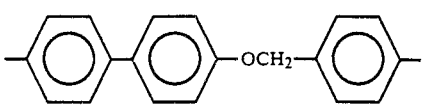

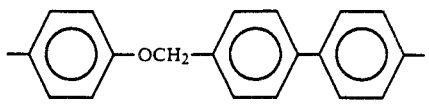

In the optically active radicals (IV) and (V), Rf1, Rf2 and Rf3 more preferably mean a perfluoroalkyl such as perfluoromethyl, perfluoroethyl, perfluoropropyl, perfluoroisopropyl, perfluorobutyl and perfluorosiobutyl, or a perfluoroalkenyl corresponding to any of the above having carbon-carbn double bonds.

In the novel compounds (I), the radical —Y—Rf are preferably derived from optically active perfluorofatty acids as follow;

Perfluoro-2-methoxypropionic acid,
Perfluoro-2-ethoxypropionic acid,
Perfluoro-2-propoxypropionic acid,
Perfluoro-2-isopropoxypropionic acid,
Perfluoro-2-butyloxypropionic acid,
Perfluoro-2-isobutyloxypropionic acid,
Perfluoro-2-pentyloxypropionic acid, and
Perfluoro-2-hexyloxypropionic acid The perfluorocarboxylic acids exemplified above are synthesized by the per se known processes e.g. disclosed in J. Fluorine Chemistry 20 475–485 (1981) and Chemistry Letters 745–748 (1982).

The liquid crystal compounds (I) of the invention may be synthesized for instance as follows;

Benzylbromide and hydroquinone are reacted to obtain 4-benzyloxyphenol (i), which is reacted with optical active perfluoro-2-(perfluoroalkoxy) propionic chloride in pyridine as a solvent to obtain 4-benzyloxyphenyl-perfluoro-2-(Perfluoroalkoxy) propionate (ii), which is then subjected to the hydrogenation in the presence of a palladium/carbon catalyst to obtain 4-hydroxyphenyl-perfluoro-2-(perfluoropropoxy) propionate (iii), which is reacted to 4-alkyloxybenzoic acid and thionyl chloride in pyridine as a solvent to obtain an objective optically active compound, 4-[perfluoro-2-(perfluoropropoxy)propionyloxy]phenyl4'-n-octyloxybenzoate.

The above synthesis is shown by reaction formulae;

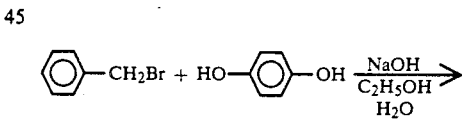

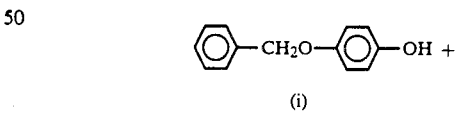

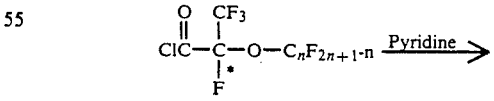

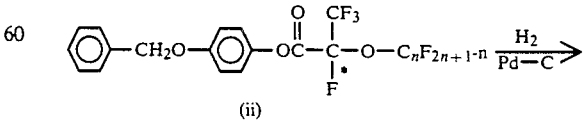

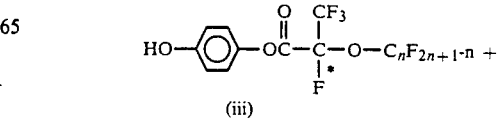

-continued

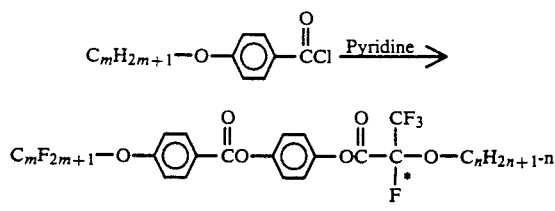

In the formulae, m and n may be same or different with each other and represent an integral of 1-20.

The other objective compound is manufactured as follows;

The compound (iii) as referred to above is treated with a base such as potassium hydroxyde and sodium hydroxide or an alkali metal hydride such as sodium hydride in a solvent such as dimethyl ether, tetrahydrofuran, dimethylformamide and dimethyl sulfoxide to form a corresponding phenoxide, which is reacted with 4-alkoxy-4'-monobromo-methylbiphenyl to obtain an objective optically active compound, 4-(4'-alkyloxy-4''-biphenylcarbinyloxy)phenyl-perfluoro-2-alkoxy-propionate.

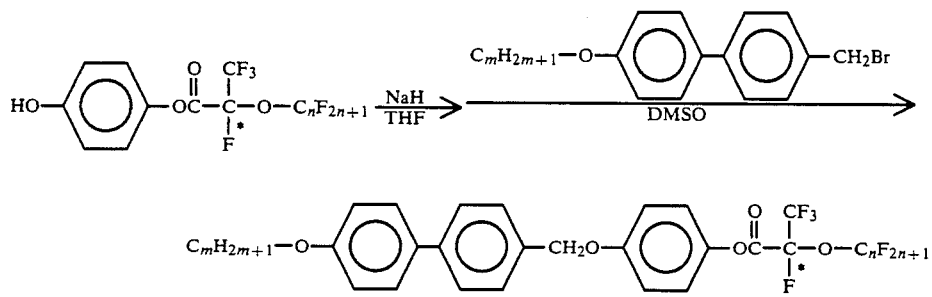

In the reaction formulae, m and n respectively represent the above.

The invention will be explained in more detail in reference to the following Examples. It is noted that the invention is of course not limited thereto.

EXAMPLE 1

(1) (+)-4-Benzyloxyphenyl-1,1,1,2-tetrafluoro-2-(perfluoro-n-propoxy)propionate

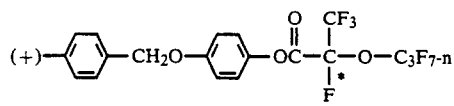

In 40 ml of pyridine, 3.6 g of 4-benzyloxyphenol was dissolved to prepare a solution, to which under ice-cooling 7 g of optically active 1,1,1,2-tetrafluoro-2-(perfluoro-n-propoxy) propionic chloride (as a precursor perfluoro-2-propoxypropionic acid, $[\alpha]_D^{20} = +28°$ was used) was droppingly added. The liquid mixture was held at the room temperature for reaction for a whole day and night, then taken in ice-water and extracted with ether. The organic phase was washed successively with water, diluted hydrochloric acid and water, dehydrated with anhydrous magnesium sulfate, distilled for removing the solvent and treated with the silica gel chromatography (n-hexane/ ethyl acetate, volume ratio of 10:1) to obtain the compound captioned above in the amount of 3.5 g.

(2) (+)-4-Hydroxyphenyl-1,1,1,2-tetrafluoro-2-(perfluoro-n-propoxy)propionate

The compound obtained in the above (1) in the amount of 3.5 g and 0.4 g of 10% palladium/carbon were added in methanol as a solvent to be reacted in an atmosphere of hydrogen at the room temperature for 5-6 hours to obtain the above compound in the amount of 2.9 g.

(3) (+)-4-[1,1,1,2-tetrafluoro-2-(perfluoro-n-propoxy)propionyloxy]phenyl-4'-n-octyloxybenzoate (Objective Compound)

4-n-Octyloxybenzoic acid in the amount of 2.0 g was reacted with 1 g of thionyl chloride in 10 ml of benzene at a temperature of 100°-110° C. for 6 hours to obtain 4-n-octyloxybenzoic chloride in the amount of 2.2 g. This 2.2 g of 4-n-octyloxybenzoic chloride and 2.9 g of the compound obtained in the above (2) were dissolved in 50 ml of pyridine to be held at the room temperature for reaction for a whole day and might. The reaction liquid was taken in ice-water and extracted with ether. The organic phase was washed successively with water, diluted hydrochloric acid and water to be neutral and then dehydrated with anhydrous magnesium sulfate. The dried product was treated with silica gel chromatography (n-hexane/ethyl acetate, volume ratio of 10:1) to obtain the optically active objective compound as captioned above in the amount of 1.6 g.

The objective liquid crystal compound of the invention showed a smectic phase and the phase transition points thereof according to observation by means of a polarizing microscope with DSC and hot stage are as follows;

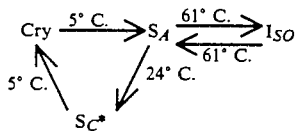

The infrared absorption spectrum (KBr) of this compound is shown in FIG. 1 of the accompanying drawing.

EXAMPLE 2

(−)-4-[1,1,1,2-tetrafluoro-2-(perfluoro-n-propoxy)-propionyloxy]phenyl-4-n-nonyloxybenzoate

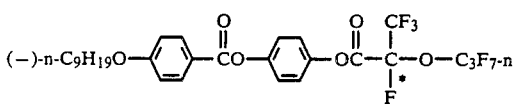

Treatments described in Example 1 were repeated except that instead of 4-n-octyloxybenzoic acid chloride in Example (3) 4-n-nonyloxybenzoic acid chloride was used to obtain the objective compound as captioned above.

The phase transition points of this liquid crystal compound is as follows;

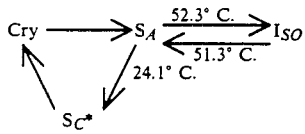

Figure 2:
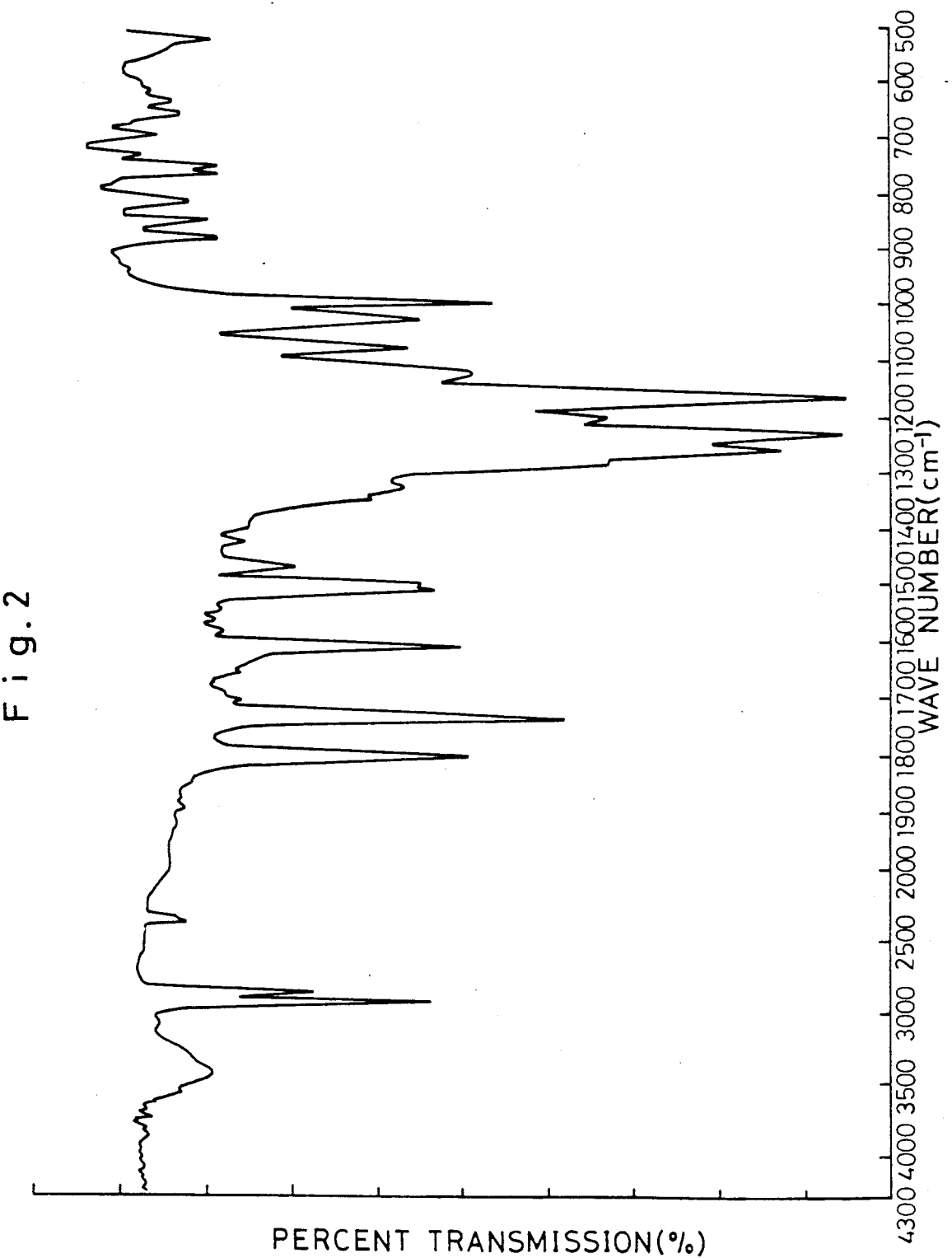
FIG. 2 shows infrared absorption spectrum of 4-[1,1,1,2-tetrafluoro-2-(perfluoro-n-propoxy) propionyloxy]phenyl-4-n-nonyloxybenzoate according to the invention.

The infrared absorption spectrum (KBr) of this compound is shown in FIG. 2.

EXAMPLE 3

(+)-4-[1,1,1,2-tetrafluoro-2-(perfluoro-isopropoxy)propionyloxy]phenyl-4-n-nonyloxybenzoate

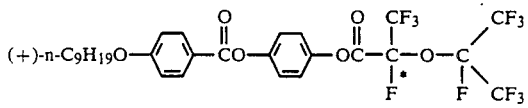

The treatments in Example 1 were repeated except that instead of optically active 1,1,1,2-tetrafluoro-2-(perfluoro-n-propoxy)propionic acid in Example (1), (+)-1,1,1,2-tetrafluoro-2-(perfluoro-isopropoxy) propionic acid ($[\alpha]_D^{20} = +31°$) was used and instead of 4-n-octyloxybenzoic chloride in Example 1 (3), 4-n-nonyloxybenzoic chloride was used to obtain the above optically active objective compound.

The phase transition points thereof are as follows;

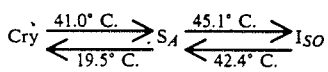

Figure 3:
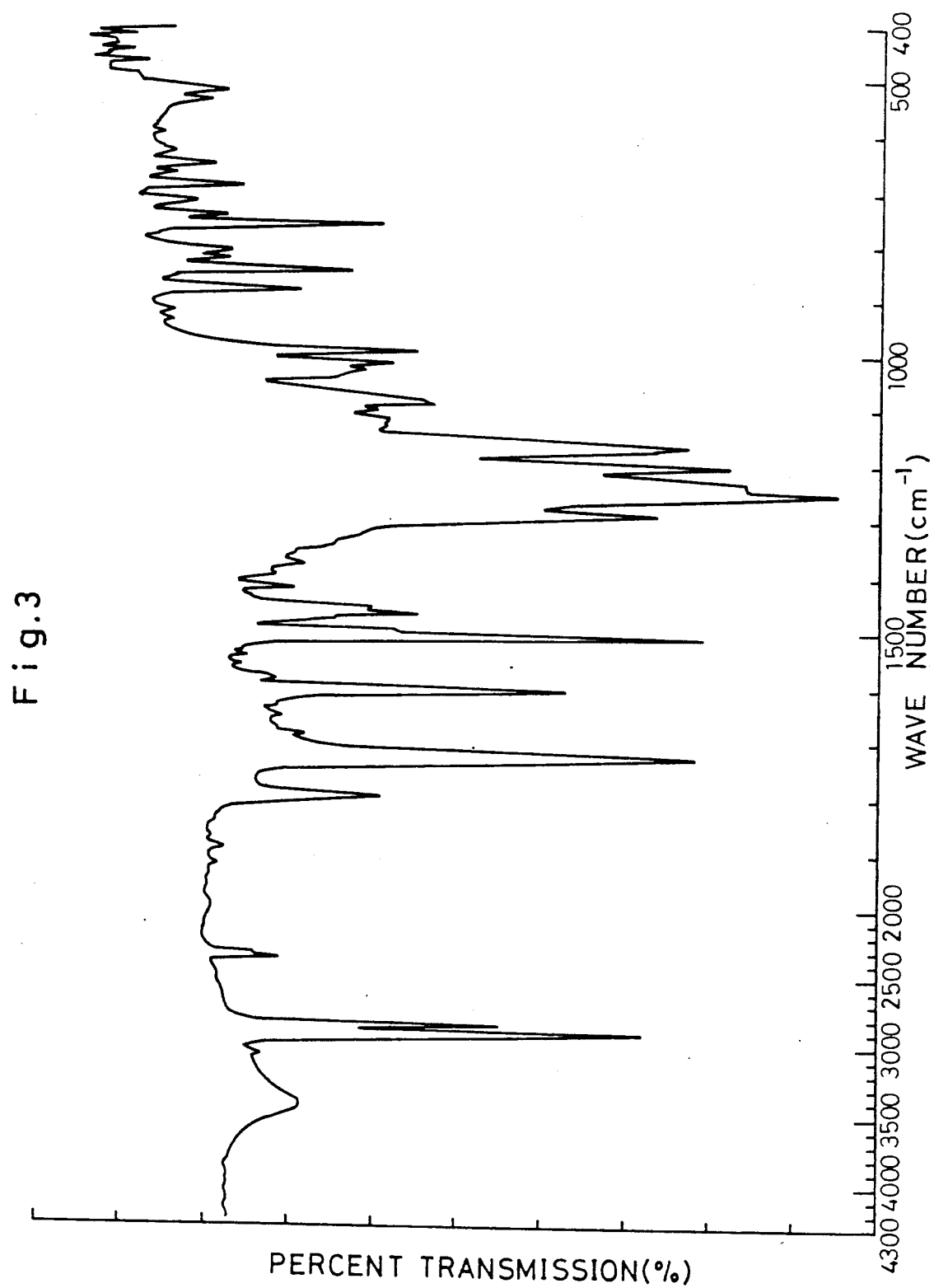
FIG. 3 shows infrared absorption spectrum of 4-[1,1,1,2-tetrafluoro-2-(perfluoro-isopropoxy) proponyloxy]phenyl-4-n-nonyloxybenzoate according to the invention.

The infrared absorption spectrum (KBr) is shown in FIG. 3.

The objective compounds (I) of the invention have a good responsibility in relation to the applied electric field as the ferroelectric liquid crystal so as to be used as non-linear display elements and liquid crystal optical shutters. Furthermore, the ferroelectric liquid crystal compounds (I) of the invention have a wide range of phase transition points inclusive of the room temperature so as not only to be used alone as the liquid crystal material but also to be mixed with other liquid crystal compounds for expanding the phase transition points to a desired range and making the response speed of the liquid crystal composition faster.

What is claimed is:

1. Liquid crystal compounds having fluoroalkyl radical represented by the general formula (I)

$$R—(A)—X—(B)—Y—Rf \qquad (I)$$

in which R means an alkyl, alkoy, alkyloxycarbonyl, alkanoyl or alkanoyloxy group having 1–20 carbon atoms; Rf means an optically active perfluoroalkoxyalkyl group; (A) and (B) respectively means

X means $-\overset{O}{\overset{\|}{C}}-$, $-\overset{O}{\overset{\|}{OC}}-$, $-CH_2O-$, $-OCH_2-$ or $-CH=N-$; and Y means $-\overset{O}{\overset{\|}{C}}OCH_2-$, $-\overset{O}{\overset{\|}{OC}}-$, or $-O-CH_2-$.

2. Liquid crystal compounds as set forth in claim 1, in which —Y—Rf in the formula (I) means an optically active perfluoro-2-propoxy-propionyloxy radical (II);

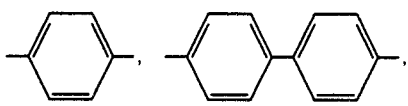

3. Liquid crystal compound as set forth in claim 1, in which —Y—Rf in the formula (I) means an optically active perfluoro-isopropoxy-propionyloxy radical (III);

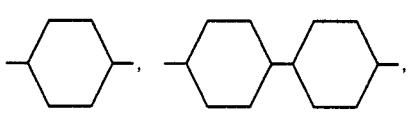

4. Liquid crystal compounds as set forth in claim 1, in which —Y—Rf in the formula (I) means an optically active perfluoro-2-alkoxyfatty acid radical (IV);

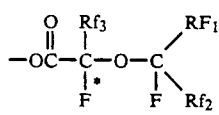

(IV)

in which Rf1, Rf2 and Rf3 may be same or different to one another and mean a perfluoroalkyl or perfluoroalkenyl group of 6 or less carbon atoms.

5. A liquid crystal compound as set forth in claim 1, which is (+)-4-[perfluoro-2-(perfluoropropoxy) propionyloxy]phenyl-4'-n-octyloxybenzoate.

6. A liquid crystal compound as set forth in claim 1, which is 4-(4'-alkyloxy-4"-biphenylyl-carbinyloxy) phenyl-perfluoro-2-alkoxy-propionate.

7. A liquid crystal compound as set forth in claim 1, which is (+)-4-[1,1,1,2-tetrafluoro-2-(perfluoro-n-propoxy) propionyloxy]phenyl-4'-n-octyloxybenzoate;

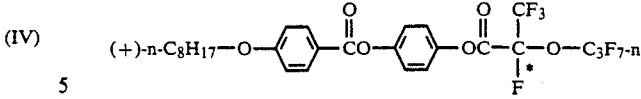

8. A liquid crystal compound as set forth in claim 1, which is (−)-4-[1,1,1,2-tetrafluoro-2-(perfluoro-n-propoxy)propionyloxy]phenyl-4-n-nonyloxybenzoate;

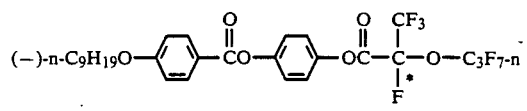

9. A liquid crystal compound as set forth in claim 1, which is (+)-4-[1,1,1,2-tetrafluoro-2-(perfluoro-iso-propoxy)propionyloxy]phenyl-4-n-nonyloxybenzoate;

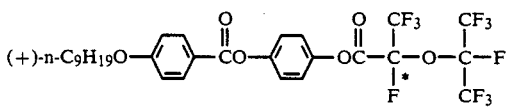

* * * * *